(12) United States Patent
Herzog et al.

(10) Patent No.: US 10,724,904 B2
(45) Date of Patent: Jul. 28, 2020

(54) TEMPERATURE INFORMATION ASSEMBLY FOR A COOKING HOB

(75) Inventors: Michael Herzog, Rothenburg/Tauber (DE); Eva Holzgreve, Porcia (IT)

(73) Assignee: Electrolux Home Products Corporation N.V., Brussels (BE)

(*) Notice: Subject to any disclaimer, the term of this patent is extended or adjusted under 35 U.S.C. 154(b) by 579 days.

(21) Appl. No.: 14/116,440

(22) PCT Filed: May 4, 2012

(86) PCT No.: PCT/EP2012/058189
§ 371 (c)(1),
(2), (4) Date: Nov. 8, 2013

(87) PCT Pub. No.: WO2012/159865
PCT Pub. Date: Nov. 29, 2012

(65) Prior Publication Data
US 2014/0098835 A1  Apr. 10, 2014

(30) Foreign Application Priority Data
May 26, 2011  (EP) ..................................... 11004333

(51) Int. Cl.
*G01K 11/22*  (2006.01)
*G01K 11/26*  (2006.01)

(52) U.S. Cl.
CPC ........ *G01K 11/265* (2013.01); *G01K 2207/08* (2013.01)

(58) Field of Classification Search
USPC ............................................. 374/152, E1.004
See application file for complete search history.

(56) References Cited

U.S. PATENT DOCUMENTS 6,075,463 A  6/2000  Wauer
6,320,169 B1 * 11/2001  Clothier ............... G06K 7/0008
                                              219/620

(Continued)

FOREIGN PATENT DOCUMENTS

CN  1691842 A  11/2005
CN  101608830 A  12/2009

OTHER PUBLICATIONS

International Search Report for PCT/EP2012/058189, dated Oct. 5, 2012, 2 pages.

(Continued)

*Primary Examiner* — Lisa M Caputo
*Assistant Examiner* — Nasir U. Ahmed
(74) *Attorney, Agent, or Firm* — Pearne & Gordon LLP

(57) ABSTRACT

The present invention relates to a temperature information assembly for a cooking hob (18). The temperature information assembly comprises at least one SAW (surface acoustic wave) temperature sensor (10) permanently or removably attached or attachable at or in a cooking pot (24), at least one sensor antenna (12) permanently or removably attached or attachable at the cooking pot (24) and electrically connected to the SAW temperature sensor (10), at least one reader (14) permanently or removably attached or attachable in or on the cooking hob (18), and at least one reader antenna (16) permanently or removably attached or attachable in or on the cooking hob (18) and electrically connected to the reader (14). The SAW temperature sensor (10) is wireless connected or connectable to the reader (14) via the sensor antenna (12) and the reader antenna (16). The reader (14) is electrically connected or connectable to a control unit (22) of the cooking hob (18) in order to control the cooking process. Further, the present invention relates to a cooking hob (18) with the temperature information assembly. Moreover, the present invention relates to a cooking pot (24) with (Continued)

Figure 1:
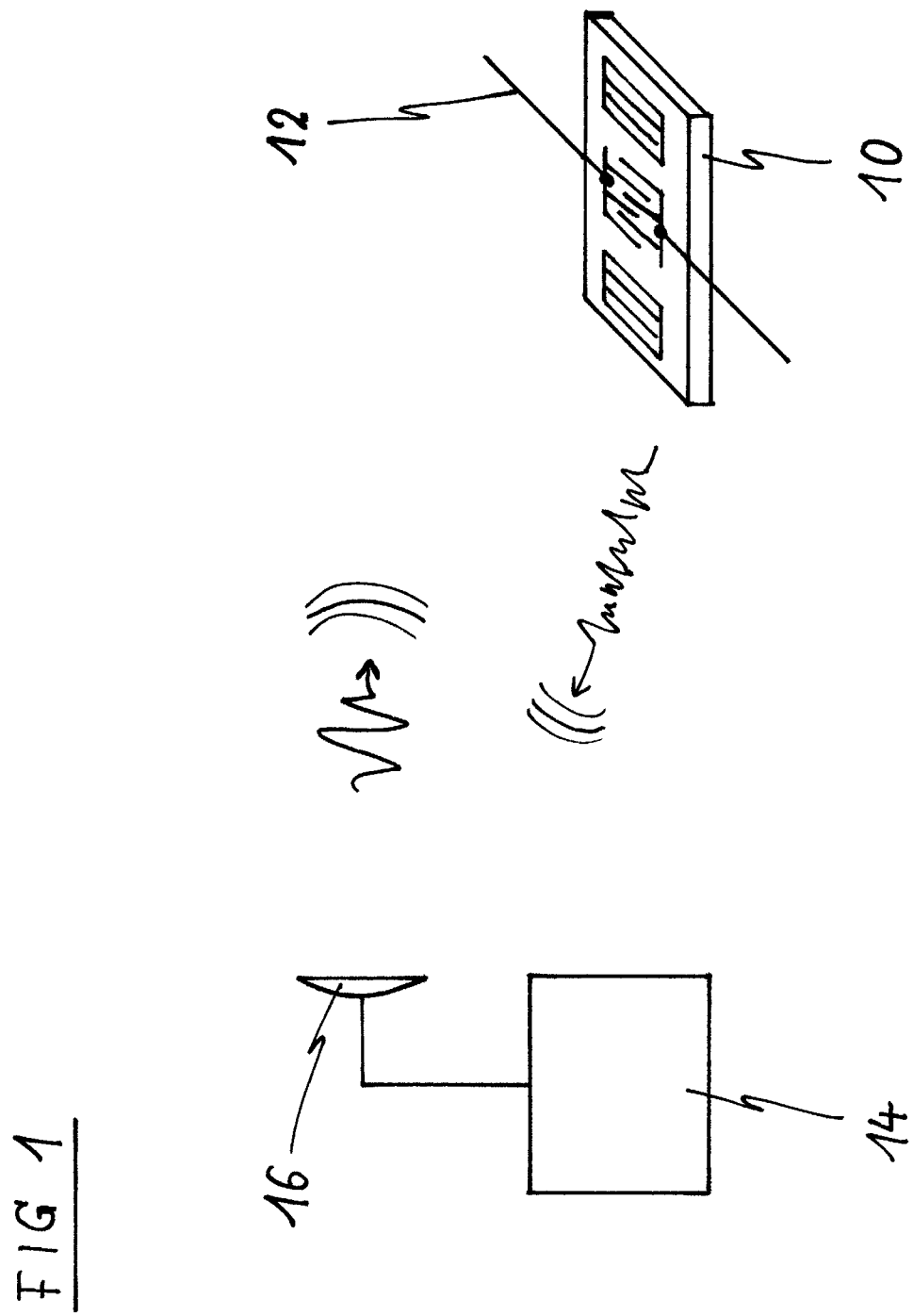

the SAW temperature sensor (10) and the sensor antenna (12) or prepared for receiving said SAW temperature sensor (10) and sensor antenna (12).

13 Claims, 8 Drawing Sheets

(56) References Cited

U.S. PATENT DOCUMENTS

| | | | | |
|---|---|---|---|---|
| 6,698,923 | B2* | 3/2004 | Bedetti | A47J 43/28 374/149 |
| 7,201,099 | B2* | 4/2007 | Harris, Jr. | G01K 1/02 374/E1.002 |
| 2002/0008632 | A1* | 1/2002 | Clothier | G06K 7/0008 340/10.1 |
| 2003/0006633 | A1* | 1/2003 | Clothier | A47C 1/12 297/180.12 |
| 2004/0149736 | A1* | 8/2004 | Clothier | H05B 6/062 219/627 |
| 2004/0164067 | A1* | 8/2004 | Badami | H05B 3/746 219/494 |
| 2005/0247696 | A1* | 11/2005 | Clothier | H05B 3/746 219/497 |
| 2008/0259995 | A1 | 10/2008 | Kuhn | |

OTHER PUBLICATIONS

Office Action (and translation) in Chinese Patent Application No. 201280031609.4, dated Nov. 1, 2016, 22 pgs.

* cited by examiner

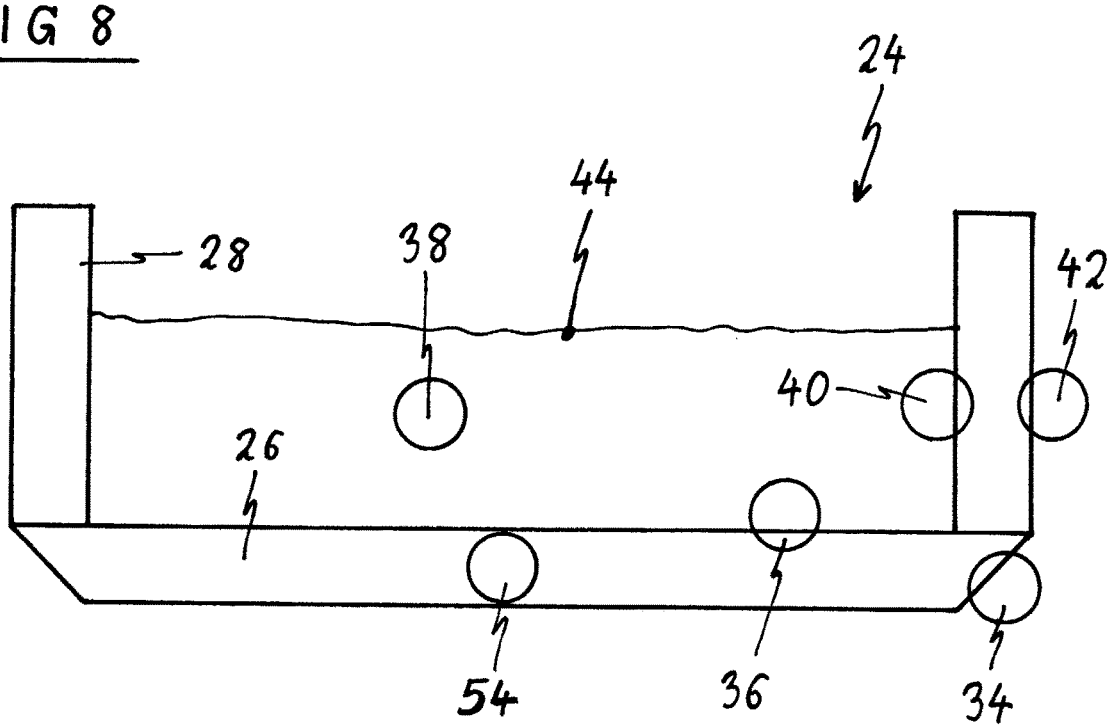
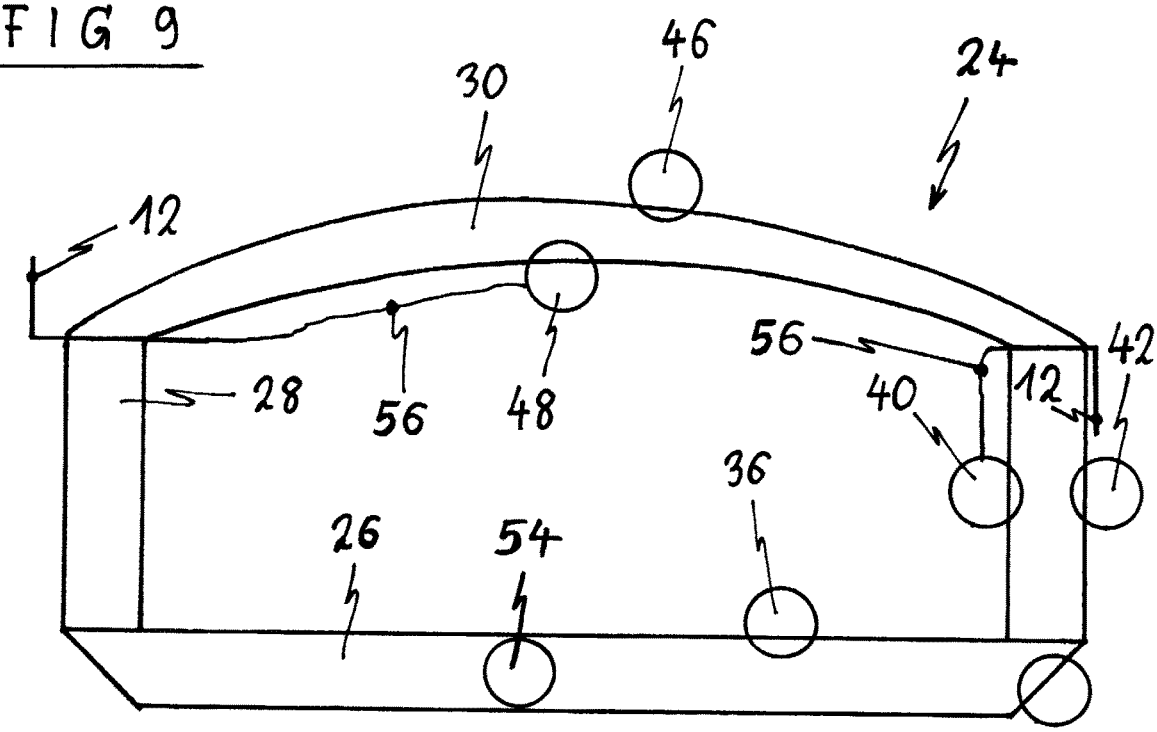

TEMPERATURE INFORMATION ASSEMBLY FOR A COOKING HOB

The present invention relates to a temperature information assembly for a cooking hob. Further, the present invention relates to a cooking hob with a temperature information assembly. Moreover, the present invention relates to a cooking pot with a SAW temperature sensor and a sensor antenna of a temperature information assembly or prepared for receiving said SAW temperature sensor and sensor antenna.

The temperature of a cookware on a cooking hob is a substantial parameter for controlling the cooking process of food stuff placed in said cookware. In the prior art there are cooking hobs with several methods for detecting the temperature of the cookware on said cooking hob.

For example, in a cooking hob with a glass ceramic panel a sensor is placed below said glass ceramic panel and the cookware placed on said panel. The detected temperature is used for the further cooking process of food stuff in the cookware by controlling the temperature of said cookware.

According to another example the temperature of a wall of the cookware is detected by a sensor from the outside of said cookware. Further, cookware with integrated sensors is known, wherein information about the temperature is transferred wireless to the cooking hob. Moreover, an oven with a wireless food probe is known using the surface acoustic wave (SAW) technology.

It is an object of the present invention to provide an improved temperature information assembly for a cooking hob.

The object of the present invention is achieved by the temperature information assembly for a cooking hob according to claim 1.

The present invention relates to a temperature information assembly for a cooking hob comprising:
- at least one SAW (surface acoustic wave) temperature sensor permanently or removably attached or attachable at or in a cooking pot,
- at least one sensor antenna permanently or removably attached or attachable at the cooking pot and electrically connected to the SAW temperature sensor,
- at least one reader permanently or removably attached or attachable in or on the cooking hob, and
- at least one reader antenna permanently or removably attached or attachable in or on the cooking hob and electrically connected to the reader, wherein
- the SAW temperature sensor is wireless connected or connectable to the reader via the sensor antenna and the reader antenna, and wherein
- the reader is electrically connected or connectable to a control unit of the cooking hob in order to control the cooking process.

The main idea of the present invention is the arrangement of the SAW temperature sensor at or in the cooking pot for determining the actual temperature of the food stuff in order to control the cooking process. The SAW temperature sensor is wireless connected or connectable to the reader via the sensor antenna and the reader antenna, wherein the reader antenna is arranged or arrangeable in or on the cooking hob.

For example, the reader and/or the reader antenna are arranged or arrangeable below a glass ceramic panel of the cooking hob.

Further, the reader and/or the reader antenna may be arranged or arrangeable between two or more cooking zones of the cooking hob.

Moreover, the reader and/or the reader antenna may be arranged or arrangeable beside one or more cooking zones of the cooking hob.

Alternatively or additionally, the reader and/or the reader antenna may be arranged or arrangeable upon a border of the cooking hob.

For example, the SAW temperature sensor and/or the sensor antenna are permanently attached or attachable at or in the cooking pot by welding, soldering and/or gluing.

Further, the SAW temperature sensor and/or the sensor antenna may be removably attached or attachable at a carrier, wherein said carrier is permanently or removably attached or attachable in or at the cooking pot.

According to another example, the SAW temperature sensor and/or the sensor antenna are removably attached or attachable at or in the cooking pot by a clip mechanism, by a magnet and/or by a suction cup.

The present invention relates further to a cooking hob with at least one cooking zone and a temperature information assembly, wherein the cooking hob comprises at least one reader and at least one reader antenna of the temperature information assembly mentioned above.

At last, the present invention relates to a cooking pot with a SAW temperature sensor and a sensor antenna or prepared for receiving said SAW temperature sensor and sensor antenna, wherein the cooking pot comprises at least one SAW temperature sensor and at least one sensor antenna of the temperature information assembly described above or is prepared for receiving at least one SAW temperature sensor and at least one sensor antenna of the temperature information assembly described above.

Novel and inventive features of the present invention are set forth in the appended claims.

Figure 2:
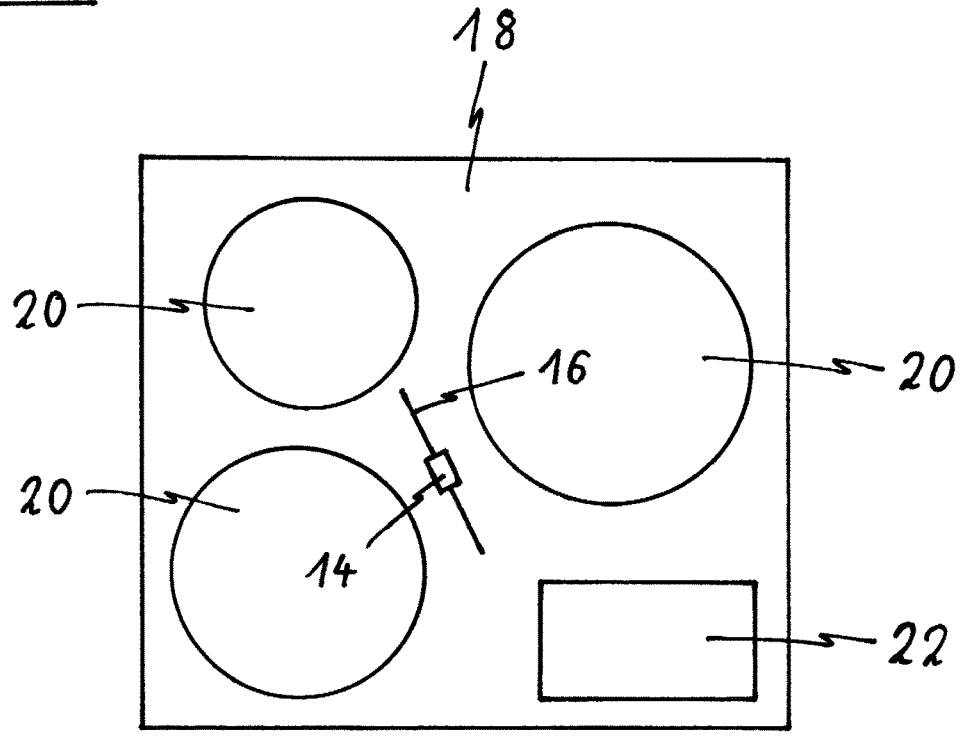
Figure 3:
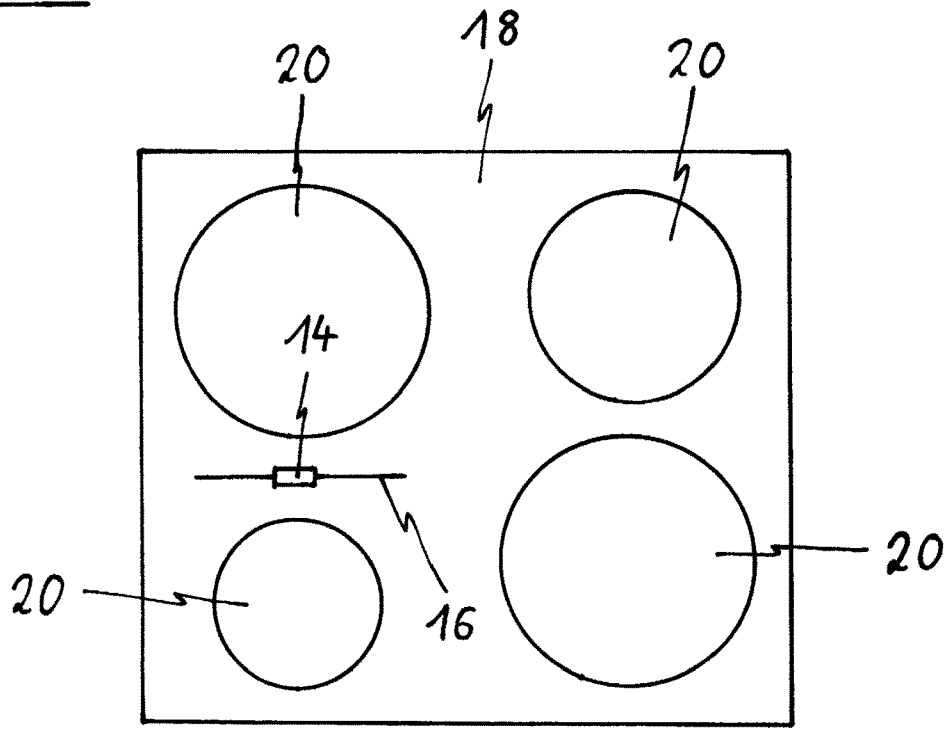
Figure 4:
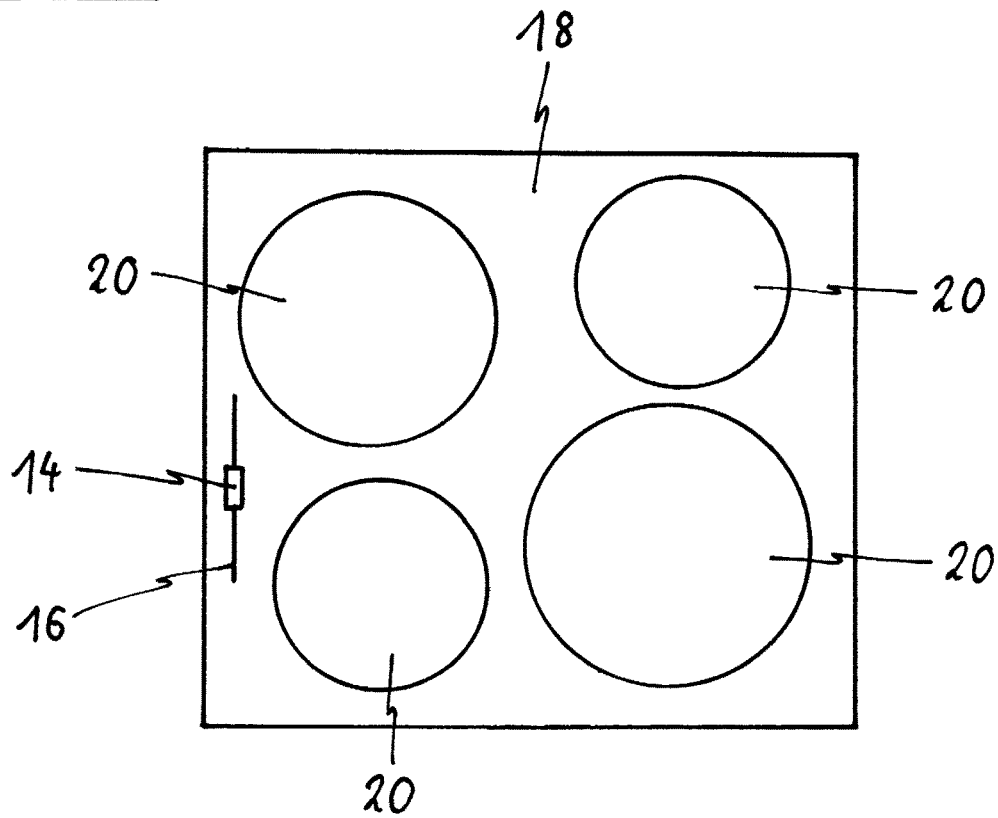
Figure 5:
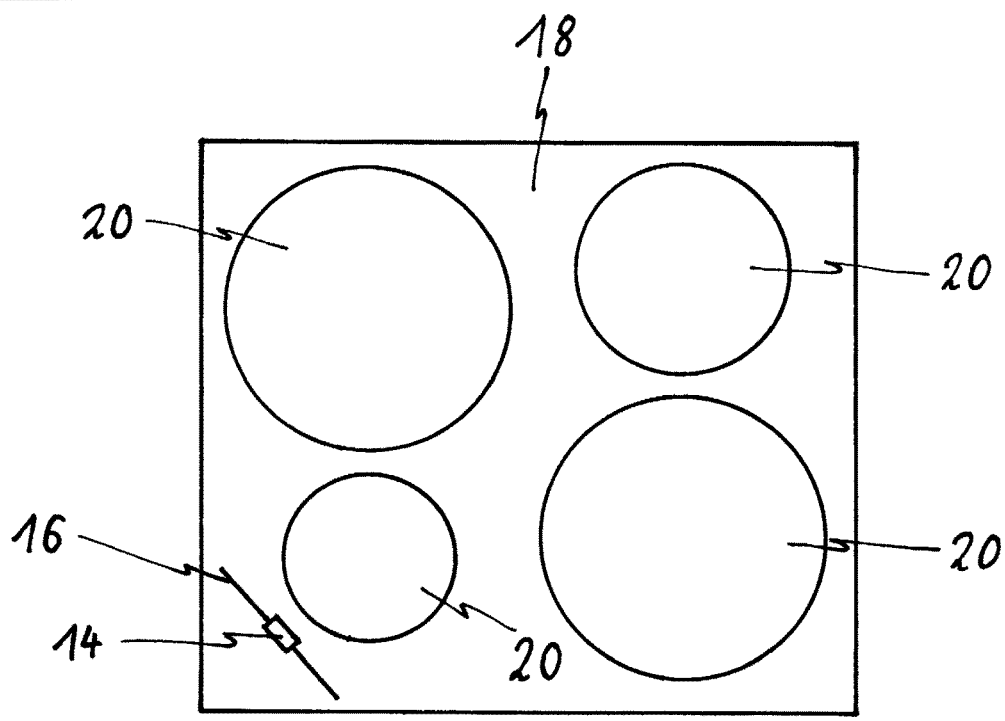
Figure 6:
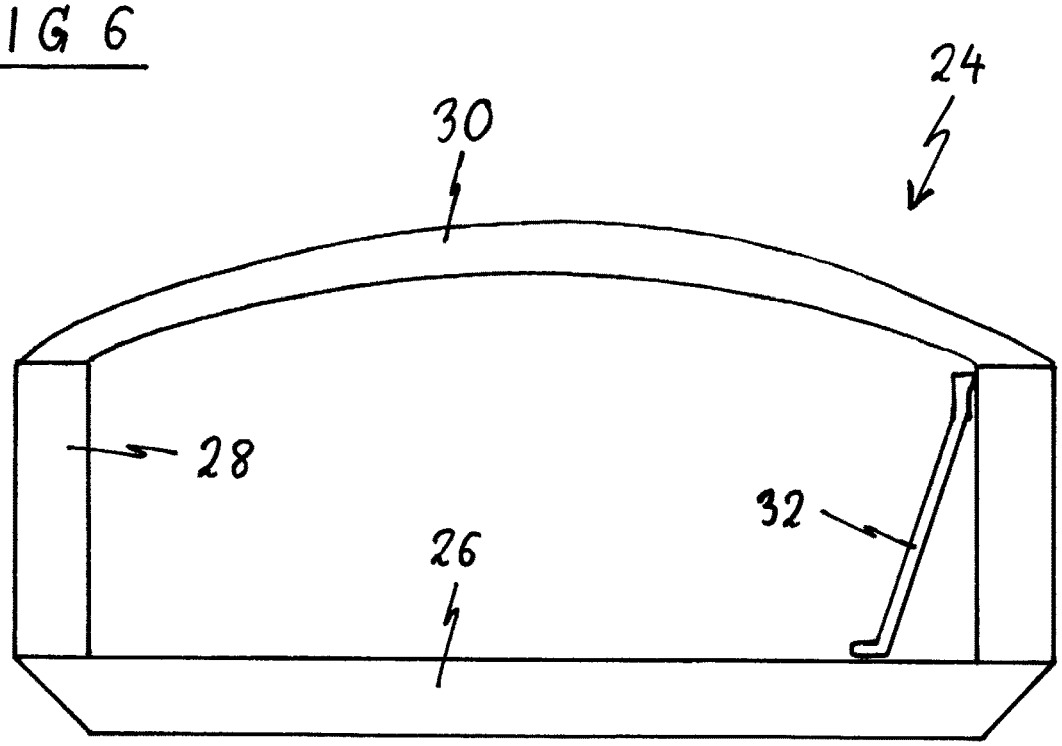
Figure 7:
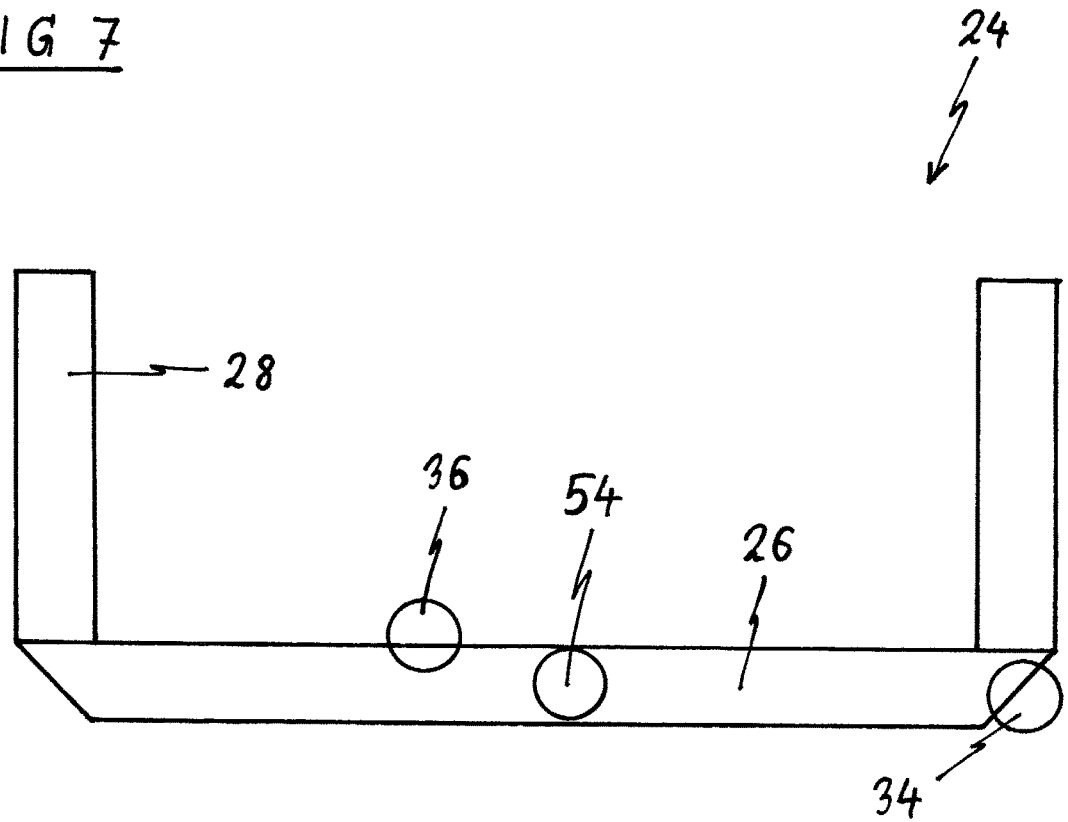
Figure 10:
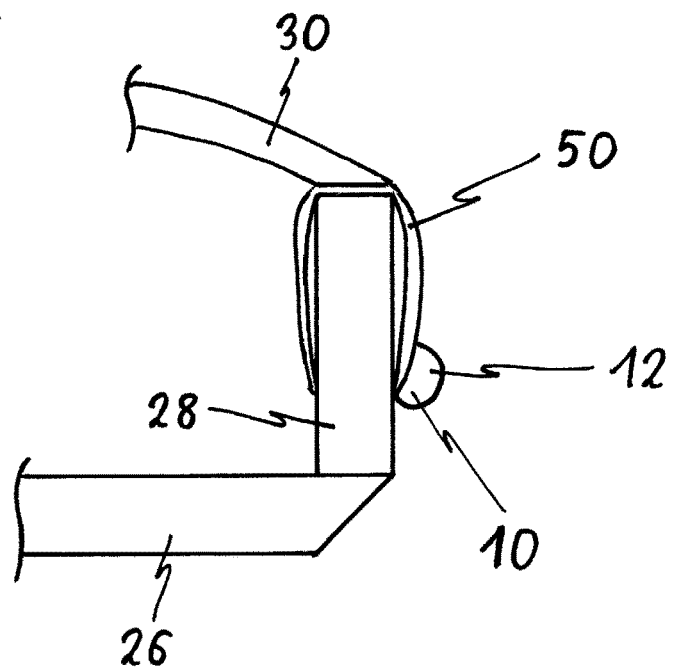
Figure 11:
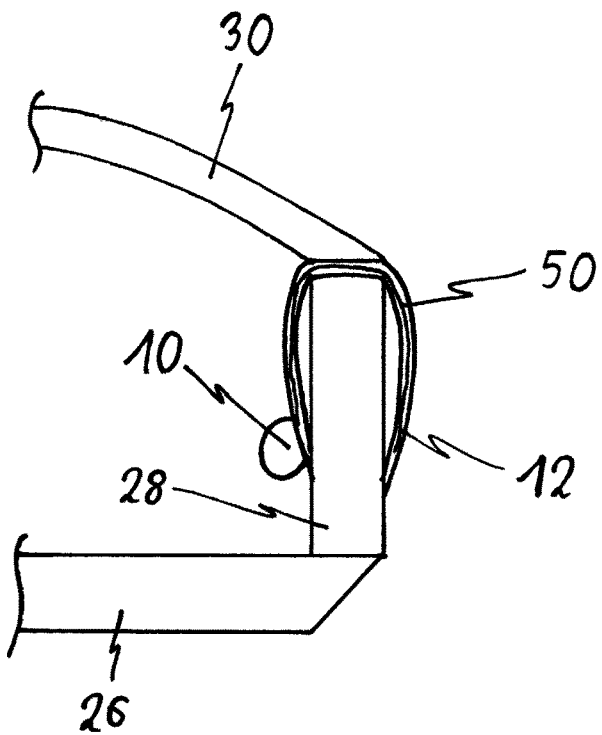
Figure 12:
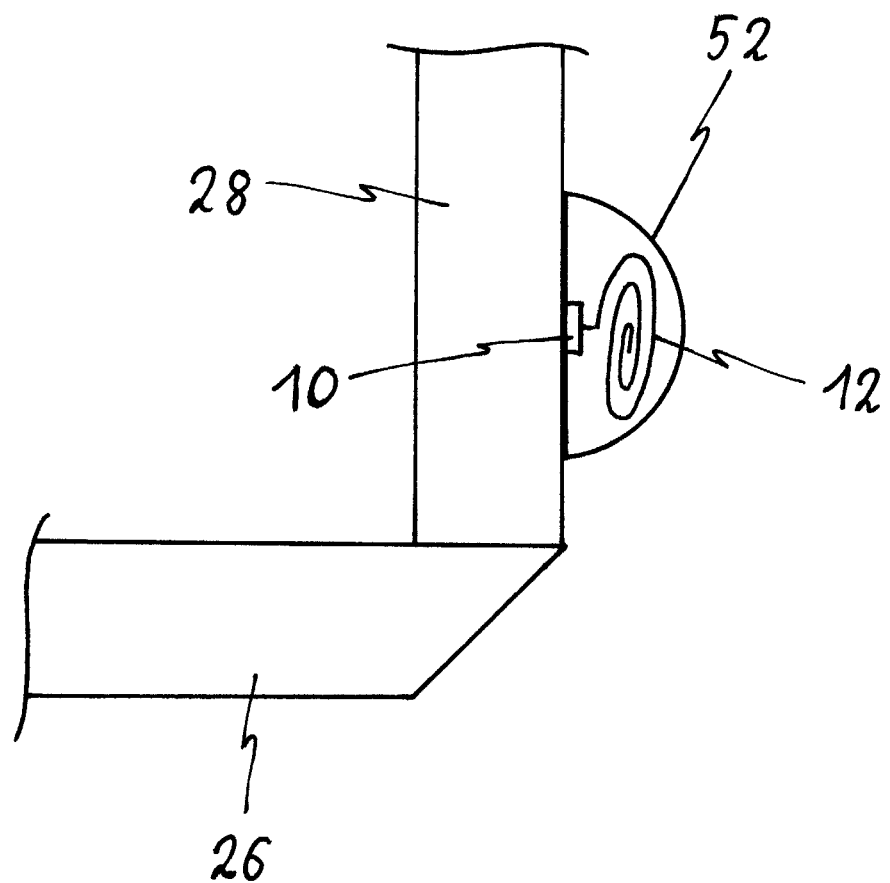
Figure 13:
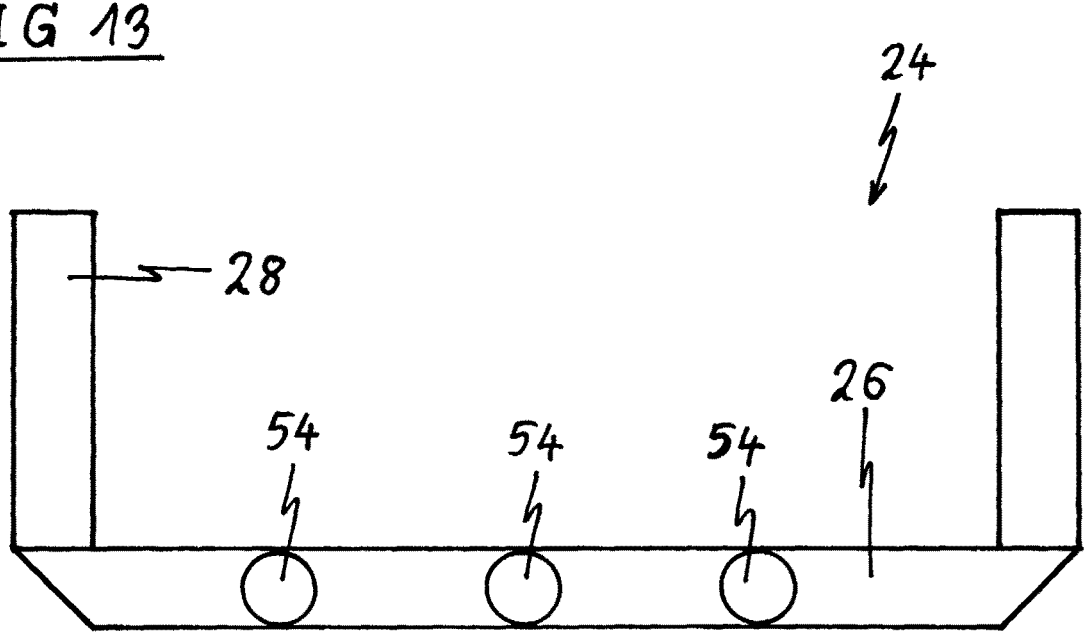
Figure 14:
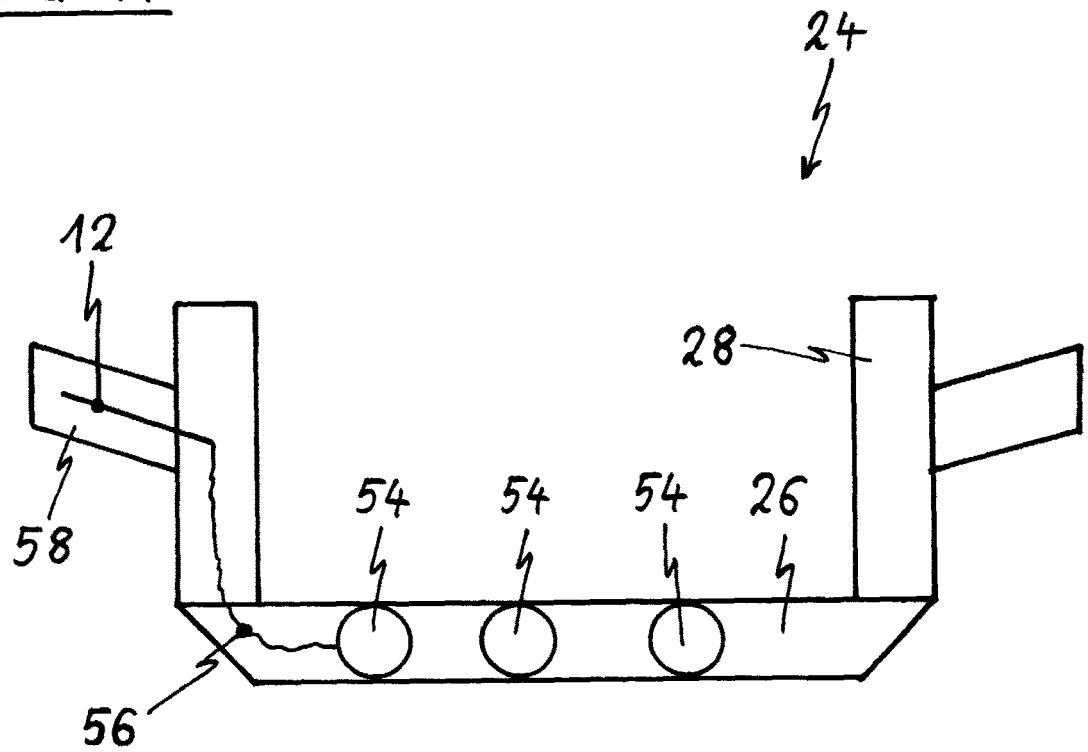

The present invention will be described in further detail with reference to the drawings, in which FIG. 1 illustrates a schematic representation of a temperature information assembly for a cooking hob according to the present invention, FIG. 2 illustrates a top view of a cooking hob with a reader and a reader antenna according to a first embodiment of the present invention, FIG. 3 illustrates a top view of a cooking hob with the reader and the reader antenna according to a second embodiment of the present invention, FIG. 4 illustrates a top view of a cooking hob with the reader and the reader antenna according to a third embodiment of the present invention, FIG. 5 illustrates a top view of a cooking hob with the reader and the reader antenna according to a fourth embodiment of the present invention, FIG. 6 illustrates a sectional side view of a cooking pot with a carrier for SAW temperature sensors according to an embodiment of the present invention, FIG. 7 illustrates a sectional side view of the cooking pot with positions for the SAW temperature sensor according to a first application of the present invention, FIG. 8 illustrates a sectional side view of the cooking pot with positions for the SAW temperature sensor according to a second application of the present invention, FIG. 9 illustrates a sectional side view of the cooking pot with positions for the SAW temperature sensor according to a third application of the present invention, FIG. 10 illustrates a sectional side view of the SAW temperature sensor and the sensor antenna fixed at the cooking pot according to an embodiment of the present invention, FIG. 11 illustrates a sectional side view of the SAW temperature sensor and the sensor antenna fixed at the cooking pot according to another embodiment of the present invention, FIG. 12 illustrates a detailed sectional side view of the SAW temperature sensor and the sensor antenna fixed at the cooking pot according to an embodiment of the present invention, FIG. 13 illustrates a sectional side view of the cooking pot with integrated SAW temperature sensors according to a further embodiment of the present invention, and FIG. 14 illustrates a sectional side view of the cooking pot with integrated SAW temperature sensors according to another embodiment of the present invention.

FIG. 1 illustrates a schematic representation of a temperature information assembly for a cooking hob 18 according to the present invention.

The temperature information assembly includes a surface acoustic wave (SAW) temperature sensor 10 connected to a sensor antenna 12. Further, the temperature information assembly includes a reader 14 connected to a reader antenna 16. The SAW temperature sensor 10 and the sensor antenna 12 form a constructional unit. In a similar way, the reader 14 and the reader antenna 16 form a constructional unit. The SAW temperature sensor 10 and the sensor antenna 12 are provided for an installation at or in a cooking pot 24. The reader 14 and the reader antenna 16 are provided for an installation in or on the cooking hob 18. The SAW temperature sensor 10 is provided for detecting the temperature in its environment, i.e. at or in the cooking pot 24.

The reader 14 is provided for emitting electromagnetic waves to the SAW temperature sensor 10 via the reader antenna 16 and the sensor antenna 12. Further, the reader 14 is provided for receiving electromagnetic waves from the SAW temperature sensor 10 via the sensor antenna 12 and the reader antenna 16. The electromagnetic waves emitted by the reader 14 provided the SAW temperature sensor 10 with energy. The electromagnetic waves emitted by the SAW temperature sensor 10 provide the reader 14 with information about the detected temperature.

The reader 14 is electrically connected to a control unit 22 of the cooking hob 18. The information about the temperature can be used for controlling the cooking process.

FIG. 2 illustrates a top view of the cooking hob 18 with the reader 14 and the reader antenna 16 according to a first embodiment of the present invention. The cooking hob 18 comprises three cooking zones 20 and the control unit 22.

The reader 14 and the reader antenna 16 are arranged substantially in the centre between the three cooking zones 20. Thus the distances between the reader antenna 16 on the one hand and possible cookware on the cooking zones 20 on the other hand are nearly equal. A wireless connection between the reader antenna 16 and the cookware on all three cooking zones 20 is possible.

FIG. 3 illustrates a top view of the cooking hob 18 with the reader 14 and the reader antenna 16 according to a second embodiment of the present invention. The cooking hob 18 comprises four cooking zones 20. The reader 14 and the reader antenna 16 are arranged between two of said four cooking zones 20. In FIG. 3 the reader 14 and the reader antenna 16 are arranged between those two the cooking zones 20 on the left hand side of the cooking hob 18. In this case, the wireless connection is only possible between the reader antenna 16 and the cookware on the both cooking zones 20 on the left hand side of the cooking hob 18.

FIG. 4 illustrates a top view of the cooking hob 18 with the reader 14 and the reader 16 antenna according to a third embodiment of the present invention. The cooking hob 18 comprises four cooking zones 20. The reader 14 and the reader antenna 16 are arranged on a border at the left hand side of the cooking hob 18. Also in this case, the wireless connection is only possible between the reader antenna 16 and the cookware on the both cooking zones 20 on the left hand side of the cooking hob 18.

FIG. 5 illustrates a top view of the cooking hob 18 with the reader 14 and the reader antenna 16 according to a fourth embodiment of the present invention. The cooking hob 18 comprises four cooking zones 20. The reader 14 and the reader antenna 16 are arranged in a left front corner of the cooking hob 18. In this case, the wireless connection is only possible between the reader antenna 16 and the cookware on the left front cooking zones 20 of the cooking hob 18.

Unlike the embodiments in FIG. 2 to FIG. 5, more than one antenna 16 may be arranged on or in the cooking hob 18.

If all cooking zones 20 shall be controlled by the SAW temperature sensors 10, then each cooking zone 20 corresponds with one reader antenna 16. Alternatively, one reader antenna 16 corresponds with a subset of cooking zones 20. Further, one reader antenna 16 corresponds with one cooking zone 20 or the subset of cooking zones 20 and the other reader antennae 16 do not correspond with any specific cooking zone 20 or subset of cooking zones 20, respectively.

If more than one cooking zone 20, but not all cooking zones 20 shall be controlled by the SAW temperature sensors 10, then each cooking zone 20 corresponds with one reader antenna 16. Alternatively, one reader antenna 16 corresponds with a subset of cooking zones 20. Moreover, one reader antenna 16 corresponds with one cooking zone 20 or the subset of cooking zones 20 and the other reader antennae 16 do not correspond with any specific cooking zone 20 or subset of cooking zones 20, respectively, but with all cooking zones 20 to be controlled.

At last, if only cooking zone 20 shall be controlled, then more than one reader antenna 16 correspond with said cooking zone 20.

In particular, the embodiments shown in FIG. 2 to FIG. 5 relate to cooking hobs 18 with a glass ceramic panel. The reader 14 and the reader antenna 16 are arranged below the glass ceramic panel. The cooking hobs 18 with the glass ceramic panel may comprise radiant heating elements, induction heating elements and/or gas heating elements. The gas heating elements may be arranged below the glass ceramic panel glass or upon the ceramic panel.

However, if the cooking hob 18 comprises gas heaters on a steel carrier or solid hot plates, then the reader antenna 16 must have a sufficient distance to the metal carrier in order to obtain the wireless connection between the sensor antenna 12 and the reader antenna 16. This can be achieved by an upright arrangement of the reader antenna 16 or the reader antennae 16, respectively, on or above the cooking hob 18. For example, the reader antennae 16 may be arranged on the border of the cooking hob 18.

FIG. 6 illustrates a sectional side view of a cooking pot 24 with a carrier 32 for SAW temperature sensors according to an embodiment of the present invention. The cooking pot 24 includes a bottom 26, a pot wall 28 and a lid 30. The carrier 32 is arranged inside the cooking pot 24 and besides the pot wall 28. The SAW temperature sensor 10 and the sensor antenna 12 may be placed at different levels. Further, more than one SAW temperature sensor 10 and sensor antenna 12 may be arranged at the carrier 32.

Instead of the carrier 32 an elongate housing may be provided, which can be vertically, horizontally or inclined positioned within the cooking pot 24. The SAW temperature sensor 10 and the sensor antenna 12 may be arranged inside said elongated housing. For example, said elongated housing is formed as a cooking tool.

FIG. 7 illustrates a sectional side view of the cooking pot 24 with positions for the SAW temperature sensor 10 according to a first application of the present invention. The first application relates to a shallow frying process, e.g. frying a steak. In this case the temperature on the upper surface of the bottom 26, where the food stuff is placed, needs to be controlled. There are two possible positions for the SAW temperature sensor 10.

A first position 34 for the SAW temperature sensor 10 is at the outer border of the bottom 26. In particular, the first position 34 is advantageous, if the bottom 26 is made of a material with a high thermal conductivity. For example, the bottom 26 is made of aluminium or has a sandwich structure.

A second position 36 for the SAW temperature sensor 10 is at the upper surface of the bottom 26. The second position 36 is advantageous, if the bottom 26 is made of steel, e.g. enamelled steel, which has low thermal conductivity. The second position 36 is close to the food stuff.

Further, an integrated SAW temperature sensor 54 may be arranged within the bottom 26 of the cooking pot 24. Said integrated SAW temperature sensor 54 may be an alternative or additional feature. The integrated SAW temperature sensor 54 requires a specific cooking pot 24 including one or more integrated SAW temperature sensors 54.

FIG. 8 illustrates a sectional side view of the cooking pot 24 with positions for the SAW temperature sensor 10 according to a second application of the present invention. The second application relates to a deep frying process. In this case, a relative big amount of oil or fat is used. For the second application five positions for the SAW temperature sensor 10 are possible.

The first position 34 for the SAW temperature sensor 10 is at the outer border of the bottom 26. The first position 34 is only advantageous, if the bottom 26 is made of a material with a high thermal conductivity. The second position 36 for the SAW temperature sensor 10 is at the upper surface of the bottom 26.

A third position 38 for the SAW temperature sensor 10 is inside the cooking pot 24 and below an upper level 44 of the oil or fat. A fourth position 40 for the SAW temperature sensor 10 is at the inner side of the pot wall 28 and below the upper level 44 of the oil or fat. A fifth position 42 for the SAW temperature sensor 10 is at the outer side of the pot wall 28 and below the upper level 44 of the oil or fat. The second position 36, the third position 38, the fourth position 40 and the fifth position 42 for the SAW temperature sensor 10 is suitable for arbitrary pans.

Further, the integrated SAW temperature sensor 54 arranged within the bottom 26 of the cooking pot 24 may be also provided. Said integrated SAW temperature sensor 54 requires a specific cooking pot 24 including one or more integrated SAW temperature sensors 54.

FIG. 9 illustrates a sectional side view of the cooking pot 24 with positions for the SAW temperature sensor 10 according to a third application of the present invention. The third application relates to a simmering process, wherein the lid 30 is used. At least six positions for the SAW temperature sensor 10 are possible for the simmering process, wherein four positions are the same as in FIG. 8.

The first position 34 for the SAW temperature sensor 10 is at the outer border of the bottom 26. The second position 36 for the SAW temperature sensor 10 is at the upper surface of the bottom 26. The fourth position 40 for the SAW temperature sensor 10 is at the inner side of the pot wall 28.

The fifth position 42 for the SAW temperature sensor 10 is at the outer side of the pot wall 28.

A sixth position 46 for the SAW temperature sensor 10 is at the outer side of the lid 30. A seventh position 48 for the SAW temperature sensor 10 is at the inner side of the lid 30.

The SAW temperature sensor 10 and the sensor antenna 12 may be permanently fixed to the cooking pot 24. The SAW temperature sensor 10 and the sensor antenna 12 can be welded, soldered and/or glued at the cooking pot 24.

Further, a holding device may be permanently fixed at the cooking pot 24, but the SAW temperature sensor 10 and the sensor antenna 12 can be removably fastened at said holding device.

Moreover, the SAW temperature sensor 10 and the sensor antenna 12 can be removably fixed at the cooking pot 24 directly. In this case, the SAW temperature sensor 10 and the sensor antenna 12 can be fixed by magnets, by gluing, by a suction cup and/or by clipping means.

Also in this case, the integrated SAW temperature sensor 54 may be arranged within the bottom 26 of the cooking pot 24. Said integrated SAW temperature sensor 54 requires a specific cooking pot 24, wherein one or more integrated SAW temperature sensors 54 are included.

FIG. 10 illustrates a sectional side view of the SAW temperature sensor 10 and the sensor antenna 12 fixed at the cooking pot 24 according to an embodiment of the present invention. The SAW temperature sensor 10 and the sensor antenna 12 correspond with a clip mechanism 50. The clip mechanism 50 is U-shaped. The SAW temperature sensor 10 and the sensor antenna 12 are arranged at one end of the clip mechanism 50. The clip mechanism 50 encloses partially an upper portion of the pot wall 28, wherein the SAW temperature sensor 10 and the sensor antenna 12 are arranged outside the cooking pot 24. The length of one or both arms of the U-shaped clip mechanism 50 may be adjustable.

FIG. 11 illustrates a sectional side view of the SAW temperature sensor 10 and the sensor antenna 12 fixed at the cooking pot 24 according to another embodiment of the present invention. The SAW temperature sensor 10 and the sensor antenna 12 correspond with the U-shaped clip mechanism 50. The SAW temperature sensor 10 is arranged at the one end of the clip mechanism 50. The sensor antenna 12 is arranged at the other end of the clip mechanism 50. The clip mechanism 50 encloses partially the upper portion of the pot wall 28, wherein the SAW temperature sensor 10 is arranged inside the cooking pot 24 and the sensor antenna 12 is arranged outside the cooking pot 24. The length of one or both arms of the U-shaped clip mechanism 50 may be adjustable.

Further, the SAW temperature sensor 10 and the sensor antenna 12 may be connected by a wire. The SAW temperature sensor 10 is arranged inside the cooking pot 24. The wire is clamped between the pot wall 28 and the lid 30. The sensor antenna 12 is arranged outside the cooking pot 24.

FIG. 12 illustrates a detailed sectional side view of the SAW temperature sensor 10 and the sensor antenna 12 fixed at the cooking pot 24 according to an embodiment of the present invention. In this embodiment the SAW temperature sensor 10 and the sensor antenna 12 are integrated inside a housing 52.

The housing 52 includes a plane surface and a spherical surface. The plane surface lies against the cooking pot 24. The SAW temperature sensor 10 is at the plane surface. The sensor antenna 12 is arranged besides the spherical surface. The sensor antenna 12 has a spiral form. For example, the housing 52 may be fixed at the pot wall 28 by a suction pad.

FIG. 13 illustrates a sectional side view of the cooking pot 24 with integrated SAW temperature sensors 54 according to a further embodiment of the present invention. Within the bottom 26 of the cooking pot 24 a number of integrated SAW temperature sensors 54 is arranged. In this example, there are three integrated SAW temperature sensors 54. The integrated SAW temperature sensors 54 are permanently arranged within the bottom 26 of the cooking pot 24. Thus a specific cooking pot 24 is required. Alternatively or additionally, the integrated SAW temperature sensors 54 are permanently arranged within the pot wall 28 of the cooking pot 24.

FIG. 14 illustrates a sectional side view of the cooking pot 24 with integrated SAW temperature sensors 54 according to another embodiment of the present invention. The bottom 26 of the cooking pot 24 includes three integrated SAW temperature sensors 54. The integrated SAW temperature sensors 54 are permanently arranged within the bottom 26 of the cooking pot 24. Additionally, the sensor antenna 12 is arranged within a handle 58 of the cooking pot 24. The integrated SAW temperature sensors 54 and the sensor antenna 12 are connected by a wire connection 56. Said wire connection 56 is integrated within the bottom 26 and the pot wall 28 of the cooking pot 24. Alternatively or additionally, the integrated SAW temperature sensors 54 are permanently arranged within the pot wall 28 of the cooking pot 24.

According to a further embodiment, the housing 52 including the SAW temperature sensor 10 and the sensor antenna 12 has such a form that it can be fixed at or on the handle 58 of the cooking pot 24. For example, the housing 52 can be clipped onto the handle 58 of the cooking pot. In this case, the housing 52 may have the form of the U-shaped, L-shaped or V-shaped profile section. In particular, the U-shaped housing may fixed on the upper portion of the pot wall 28. Further, the housing 52 may have a flat and/or curved form, so that the housing 52 can be hung into a recess of the handle 58.

According to a further embodiment, the housing 52 including the SAW temperature sensor 10 and the sensor antenna 12 may comprise a string. The housing 52 may fixed at the handle 58 of the cooking pot 24, so that the housing 52 hangs closely besides the outer pot wall 28.

LIST OF REFERENCE NUMERALS 10 surface acoustic wave (SAW) temperature sensor
12 sensor antenna
14 reader
16 reader antenna
18 cooking hob
20 cooking zone
22 control unit
24 cooking pot
26 bottom
28 pot wall
30 lid
32 carrier for temperature sensors
34 first position for the temperature sensor
36 second position for the temperature sensor
38 third position for the temperature sensor
40 fourth position for the temperature sensor
42 fifth position for the temperature sensor
44 upper level of oil or fat
46 sixth position for the temperature sensor
48 seventh position for the temperature sensor
50 clip mechanism
52 housing
54 position for the integrated temperature sensor
56 wire connection
58 handle

The invention claimed is:

1. A cooking hob, comprising a plurality of cooking zones and a temperature information assembly, the temperature information assembly comprising:
   a SAW (surface acoustic wave) temperature sensor removably attachable or freely positionable at any one of a plurality of cooking pots, when situated at any one of the plurality of cooking zones,
   the SAW temperature sensor being electrically connected to and associated with a sensor antenna also removably attachable or freely positionable at one of said plurality of cooking pots at which the SAW temperature sensor is removably attachable or freely positionable, wherein the SAW temperature sensor and associated sensor antenna are removably attached at an elongated carrier that is removably attachable or freely positionable at one of said plurality of cooking pots at which the SAW temperature sensor is removably attachable or freely positionable or is arranged inside an elongated housing positionable at that one of said plurality of cooking pots,
   a single reader permanently attached or attachable in or on the cooking hob, and
   a reader antenna permanently attached or attachable in or on the cooking hob and electrically connected to the single reader wherein
   the SAW temperature sensor is wirelessly connected or connectable to the single reader via the associated sensor antenna and the reader antenna, wherein the single reader is electrically connected or connectable to a control unit of the cooking hob in order to control a cooking process, and wherein
   the reader antenna is arranged between two or more of the cooking zones of the cooking hob for establishing a wireless connection only with the sensor antenna provided at one of said plurality of cooking pots situated at one of the cooking zones between which the reader antenna is arranged.

2. The cooking hob according to claim 1, wherein the single reader and/or the reader antenna are arranged or arrangeable below a glass ceramic panel of the cooking hob.

3. The cooking hob according to claim 1, wherein the elongated device is a carrier at which the SAW temperature sensor and the sensor antenna are removably attached or attachable.

4. The cooking hob according to claim 1, wherein the elongated device is an elongated housing in which the SAW temperature sensor and the sensor antenna are permanently attached or attachable.

5. The cooking hob according to claim 4, wherein the elongated housing is formed as a cooking tool that is freely positionable at one of said plurality of cooking pots.

6. The cooking hob according to claim 1, wherein the SAW temperature sensor and/or the sensor antenna are permanently attached or attachable at or in the cooking pot by welding, soldering and/or gluing.

7. The cooking hob according to claim 1, wherein the SAW temperature sensor and/or the sensor antenna are removably attached or attachable at or in the cooking pot by a clip mechanism, by a magnet and/or by a suction cup.

8. The cooking hob according to claim 1, wherein the SAW temperature sensor and/or the sensor antenna are removably attached or attachable at a carrier that is arrangable in or at the cooking pot with the SAW temperature sensor and the sensor antenna placed at different levels.

9. A cooking pot situated at any one of the plurality of cooking zones of the cooking hob of claim 1, comprising:
the SAW temperature sensor (10) and the sensor antenna (12) of the cooking hob and temperature information assembly according to claim 1 or is prepared for receiving the SAW temperature sensor (10) and the sensor antenna (12) of the temperature information assembly according to claim 1.

10. The cooking hob according to claim 1, wherein the reader antenna is arranged in the centre of the cooking hob, and the SAW temperature sensor and the sensor antenna are placed or placeable at different levels.

11. The cooking hob according to claim 1, wherein the reader is arranged between two or more of the cooking zones.

12. The cooking hob according to claim 1, wherein the reader antenna is arranged at a location that is equidistant from each of the plurality of cooking zones between which the reader antenna is arranged.

13. The cooking hob according to claim 1, wherein the reader antenna is arranged at a location at which the single reader is in a wireless connection with the sensor antennae at more than one but less than all of the plurality of cooking zones.

* * * * *